(12) United States Patent
Shinohara et al.

(10) Patent No.: US 11,310,472 B2
(45) Date of Patent: Apr. 19, 2022

(54) INFORMATION PROCESSING DEVICE AND IMAGE GENERATION METHOD FOR PROJECTING A SUBJECT IMAGE ONTO A VIRTUAL SCREEN

(71) Applicant: SONY INTERACTIVE ENTERTAINMENT INC., Tokyo (JP)

(72) Inventors: Takayuki Shinohara, Tokyo (JP); Shinpei Yamaguchi, Tokyo (JP); Tomo Matayoshi, Tokyo (JP); Hidehiko Morisada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/759,655

(22) PCT Filed: Nov. 16, 2017

(86) PCT No.: PCT/JP2017/041324
§ 371 (c)(1),
(2) Date: Apr. 27, 2020

(87) PCT Pub. No.: WO2019/097639
PCT Pub. Date: May 23, 2019

(65) Prior Publication Data
US 2020/0336717 A1    Oct. 22, 2020

(51) Int. Cl.
*H04N 9/75* (2006.01)
*G06T 17/00* (2006.01)
(Continued)

(52) U.S. Cl.
CPC ............... *H04N 9/75* (2013.01); *G06F 3/012* (2013.01); *G06F 3/013* (2013.01); *G06T 17/00* (2013.01); *G06T 19/00* (2013.01); *H04N 5/272* (2013.01)

(58) Field of Classification Search
CPC . H04N 9/75; H04N 5/272; H04N 7/18; G06F 3/012; G06F 3/013; G06F 3/011;
(Continued)

(56) References Cited

U.S. PATENT DOCUMENTS

| | | | |
|---|---|---|---|
| 2015/0243036 A1* | 8/2015 | Hoffmann | G06T 7/75 382/103 |
| 2018/0004478 A1* | 1/2018 | Chen | G06F 3/1454 |
| 2020/0252593 A1* | 8/2020 | Chapdelaine-Couture | G06T 19/006 |

FOREIGN PATENT DOCUMENTS

| | | |
|---|---|---|
| JP | 2003219382 A | 7/2003 |
| JP | 2012-104021 A | 5/2012 |

(Continued)

OTHER PUBLICATIONS

Fairchild, Allen J., et al. "A mixed reality telepresence system for collaborative space operation." IEEE Transactions on Circuits and Systems for Video Technology 27.4 (2016): 814-827.*
(Continued)

*Primary Examiner* — Jitesh Patel
(74) *Attorney, Agent, or Firm* — Katten Muchin Rosenman LLP

(57) ABSTRACT

An image acquisition unit 40 acquires a subject image in which a subject is positioned in front of a background with a single color. An eye gaze information determination unit 32 determines an eye direction and a viewpoint position of a user wearing an HMD and provides the eye direction and the viewpoint position for a display control unit 50. The display control unit 50 performs chroma-key composition such that the subject included in the subject image may become a foreground image with respect to a background image and thereby generates a display image according to the viewpoint position of the user. The display control unit 50 determines an orientation of the subject such that the
(Continued)

subject may be made to face the viewpoint position of the user, in a case where the viewpoint position has been changed.

6 Claims, 12 Drawing Sheets

(51) Int. Cl.
*G06T 19/00* (2011.01)
*H04N 5/272* (2006.01)
*G06F 3/01* (2006.01)

(58) Field of Classification Search
CPC ........... G06T 17/00; G06T 19/00; G06T 1/00; G09G 3/20
See application file for complete search history.

(56) References Cited

FOREIGN PATENT DOCUMENTS

| | | |
|---|---|---|
| JP | 2017-97122 A | 6/2017 |
| WO | 2014091824 A1 | 6/2014 |

OTHER PUBLICATIONS

Yousefi, Shahrouz, et al. "3D gesture-based interaction for immersive experience in mobile VR." 2016 23rd International Conference on Pattern Recognition (ICPR). IEEE, 2016.*

Lopez-Moreno J., "Compositing and Chroma Keying",(2015), In: Luo R. (eds) Encyclopedia of Color Science and Technology. Springer, Berlin, Heidelberg. https://doi.org/10.1007/978-3-642-27851-8_173-3.*

International Preliminary Report on Patentability dated May 19, 2020, from International Application No. PCT/JP2017/041324, 14 sheets.

International Search Report and Written Opinion dated Jan. 23, 2018, from International Application No. PCT/JP2017/041324, 9 sheets.

* cited by examiner

FIG.6
(a)
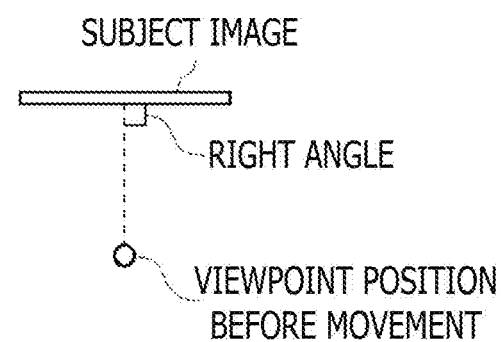
(b)
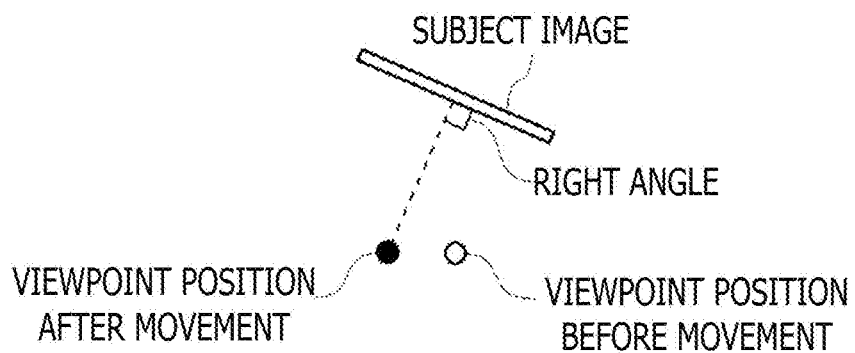

INFORMATION PROCESSING DEVICE AND IMAGE GENERATION METHOD FOR PROJECTING A SUBJECT IMAGE ONTO A VIRTUAL SCREEN

TECHNICAL FIELD

The present invention relates to a technique for chroma-key composition of a subject image in which a subject is imaged and a background image.

BACKGROUND ART

Head-mounted displays (HMDs) each provide an image for an entire visual field of a user and enhance a sense of immersion of the user into world of image. The sense of immersion into the world of image can be further enhanced by provision for the HMD of a head tracking function in which images of a three-dimensional space are provided in conjunction with a posture, a position, or the like of a head part of the user.

SUMMARY

Technical Problem

In the past, a technique for chroma-key composition of a subject image in which a subject is imaged and a background image has existed. The inventor has sought possibility of the chroma-key composition technique and has come to realize possibility that new experience can be provided for users through adjustment of an orientation of the subject image.

The present invention mainly aims at providing a technique for performing the chroma-key composition with the adjustment of the orientation of the subject image.

Solution to Problem

In order to solve an above problem, an information processing device according to a mode of the present invention includes an image acquisition unit that acquires a subject image in which a subject is positioned in front of a background with a single color, and a display control unit that generates a display image according to a viewpoint position of a user by performing chroma-key composition such that the subject included in the subject image becomes a foreground image with respect to a background image. The display control unit determines an orientation of the subject such that the subject is made to face the viewpoint position of the user, in a case where the viewpoint position has been changed.

Another mode of the invention is an image generation method. The method includes the steps of acquiring a subject image in which a subject is positioned in front of a background with a single color, generating a display image according to a viewpoint position of a user by performing chroma-key composition such that the subject included in the subject image becomes a foreground image with respect to a background image, and generating a display image by moving an orientation of the subject such that the subject is made to face the viewpoint position of the user, in a case where the viewpoint position of the user has been changed.

Still another mode of the invention is an information processing device. The device includes a three-dimensional data acquisition unit that acquires a three-dimensional space model produced from shot images of a space, an image acquisition unit that acquires a subject image in which a subject moves in front of a background with a single color, a subject layer image generation unit that projects the subject image onto a virtual screen moving in conformity with a movement of the subject included in the subject image and that extracts a subject portion through application of a chroma-key process, and a display processing unit that generates a display image according to a viewpoint position of a user with a subject layer image placed in the three-dimensional space model.

Still another mode of the invention is an image generation method. The method includes the steps of acquiring a three-dimensional space model produced from shot images of a space, acquiring a subject image in which a subject moves in front of a background with a single color, projecting the subject image onto a virtual screen moving in conformity with a movement of the subject included in the subject image, extracting a subject portion through application of a chroma-key process to the virtual screen on which the subject image is projected, and generating a display image according to a viewpoint position of a user with the subject placed in the three-dimensional space model.

In addition, any combination of above components and expression of the present invention converted among a method, a device, a system, a computer program, a recording medium in which a computer program is readably recorded, a data structure, and the like are also effective as modes of the present invention.

Advantageous Effect of Invention

According to the present invention, a technique for performing the chroma-key composition with adjustment of the orientation of the subject image can be provided.

BRIEF DESCRIPTION OF DRAWINGS

FIGS. 6(a) and 6(b) are diagrams for description of positional relation among viewpoint positions, a subject image, and a background image.

DESCRIPTION OF EMBODIMENTS

Embodiment 1

Figure 1:
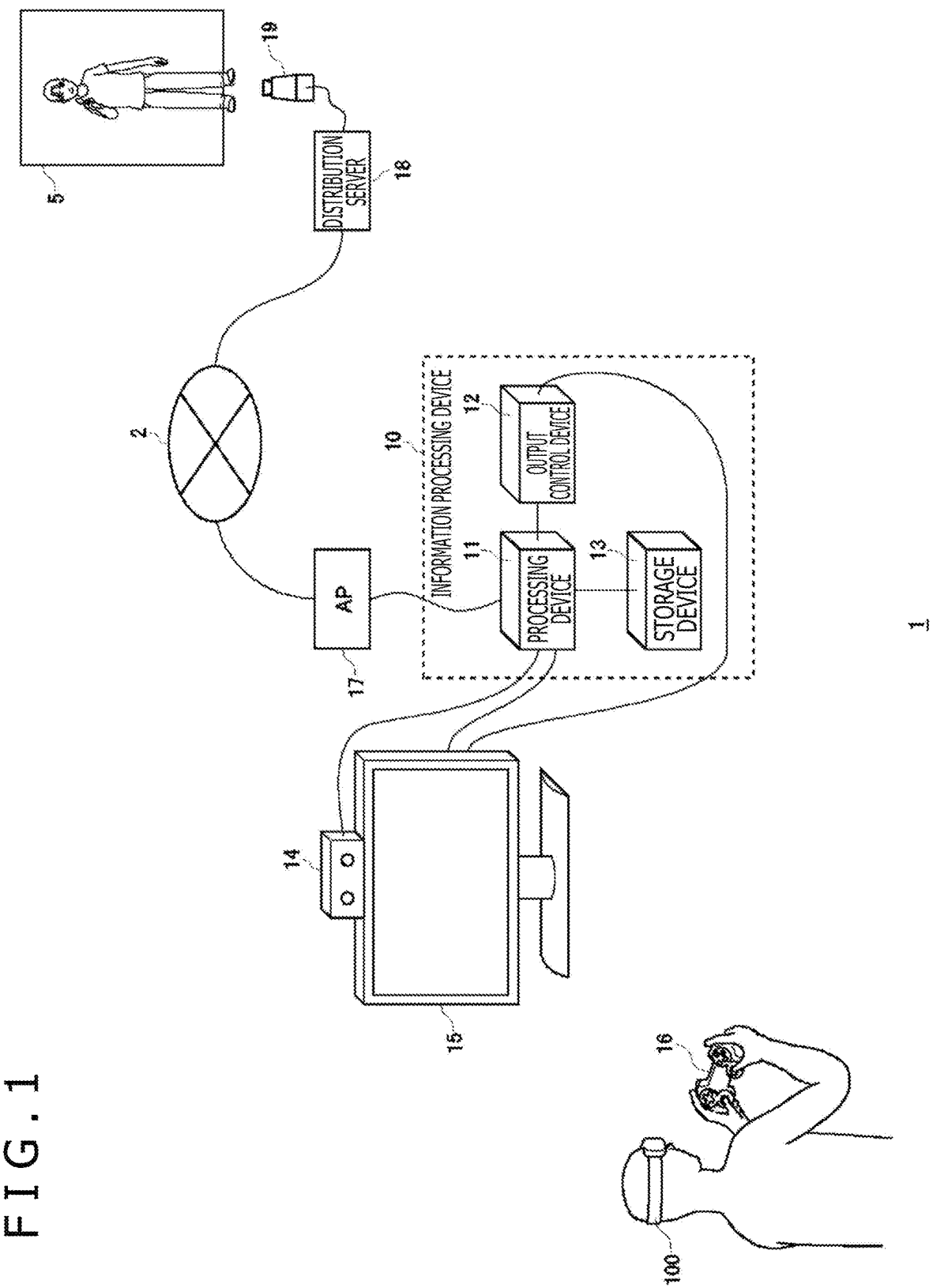
FIG. 1 is a diagram illustrating a configuration example of an information processing system in embodiment 1.

FIG. 1 illustrates a configuration example of an information processing system 1 in embodiment 1. The information processing system 1 includes an information processing device 10, a head-mounted display (HMD) 100, an input device 16 that is manipulated with fingers by a user, an imaging device 14 that images the user wearing the HMD 100, and an output device 15 that displays images. The output device 15 may be a television. The information processing device 10 is connected through an access point (AP) 17 to an external network 2 such as the Internet. The AP 17 has functions of a wireless access point and a router and the information processing device 10 may be connected to the AP 17 with use of a cable or with use of a known wireless communication protocol.

The information processing device 10 is connected to a distribution server 18 via the network 2. The distribution server 18 is a streaming distribution device that relays live images being shot in a video studio or the like. In embodiment 1, a subject is a reporter having a microphone and reading news aloud toward an imaging device 19. The imaging device 19 images the reporter who is standing in front of a color screen 5 having a single color and who is facing the imaging device 19. Though the color screen 5 may be a screen with the single color such as blue or green, the single color may be another color. Images shot by the imaging device 19 each undergo chroma-key composition with a background image through application of a chroma-key process in the information processing device 10.

The HMD 100, worn on a head part of the user, provides world of image for the user. In embodiment 1, the HMD 100 provides the user with composite images resulting from the chroma-key composition with the subject images provided from the distribution server 18. By provision for the HMD 100 of a head tracking function in which the chroma-key composite images are updated in conjunction with a movement of the head part of the user, the user is made capable of looking at the images from a favorite eye direction or a favorite viewpoint position.

The information processing device 10 includes a processing device 11, an output control device 12, and a storage device 13. The processing device 11 is a terminal device that performs the chroma-key composition of the subject images distributed from the distribution server 18 and the background images and that provides the chroma-key composite images for the HMD 100. The processing device 11 and the input device 16 may be connected with use of a cable or with use of a known wireless communication protocol. The processing device 11 of embodiment 1 has functions of receiving positional information and posture information regarding the HMD 100 as manipulation information from the user for changing an eye gaze position and the eye direction and of updating the images to be displayed in the HMD 100. The output control device 12 is a processing unit that outputs image data generated in the processing device 11 to the HMD 100 and the output control device 12 and the HMD 100 may be connected with use of a cable or with use of a known wireless communication protocol.

The imaging device 14 is a stereo camera, images the user wearing the HMD 100 at specified intervals, and supplies shot images to the processing device 11. As will be described later, the HMD 100 is provided with markers (light-emitting diodes (LEDs) for tracking) for tracking the head part of the user and the processing device 11 detects a movement of the HMD 100 based on positions of the markers included in the shot images. The HMD 100 is equipped with posture sensors (acceleration sensor and gyro sensor) and the processing device 11 carries out an accurate tracking process through acquisition of sensor data detected by the posture sensors from the HMD 100 in combination with utilization of the shot images of the markers. As for the tracking process, various schemes have been conventionally proposed and any tracking scheme may be adopted as long as the processing device 11 is capable of detecting the movement of the HMD 100.

Though the output device 15 is not necessarily required for the user wearing the HMD 100 because the user looks at the images through the HMD 100, preparation of the output device 15 enables another user to look at display images on the output device 15. The output control device 12 or the processing device 11 may cause the output device 15 to display the same images that the user wearing the HMD 100 looks at.

The HMD 100 is a display device that is worn on the head part of the user and that thereby displays images on display panels positioned in front of eyes of the user. The HMD 100 separately displays images for the left eye on the display panel for the left eye and images for the right eye on the display panel for the right eye. The images configure parallax images as seen from left and right viewpoints so as to attain stereoscopic vision. In addition, the user looks at the display panels through optical lenses and thus the information processing device 10 supplies the HMD 100 with parallax image data compensated for optical distortion caused by the lenses. This compensation process for the optical distortion may be carried out by either of the processing device 11 and the output control device 12.

Functions of the output control device 12 may be integrated into the processing device 11. Processing units of the information processing device 10 may include the one processing device 11 or may include the processing device 11 and the output control device 12. Hereinbelow, functions of providing the images for the HMD 100 will be collectively described as functions of the information processing device 10.

The information processing device 10 detects position coordinates and the posture of the head part of the user (in particular, of the HMD 100) by carrying out the head tracking process for the user. Herein, the position coordinates of the HMD 100 are the position coordinates in a three-dimensional space having an origin on a reference position and the reference position may have the position coordinates (latitude and longitude) at time when the HMD 100 is powered on. Besides, the posture of the HMD 100 refers to tilts in three axial directions relative to a reference posture in the three-dimensional space. The reference posture is a posture that makes the eye direction of the user a horizontal direction and may be set up when the HMD 100 is powered on.

The information processing device 10 is capable of detecting the position coordinates and the posture of the HMD 100 from only sensor data detected by the posture sensors of the HMD 100 and is further capable of accurately detecting the position coordinates and the posture of the HMD 100 by image analysis for the markers (LEDs for tracking) of the HMD 100 imaged by the imaging device 14.

Figure 2:
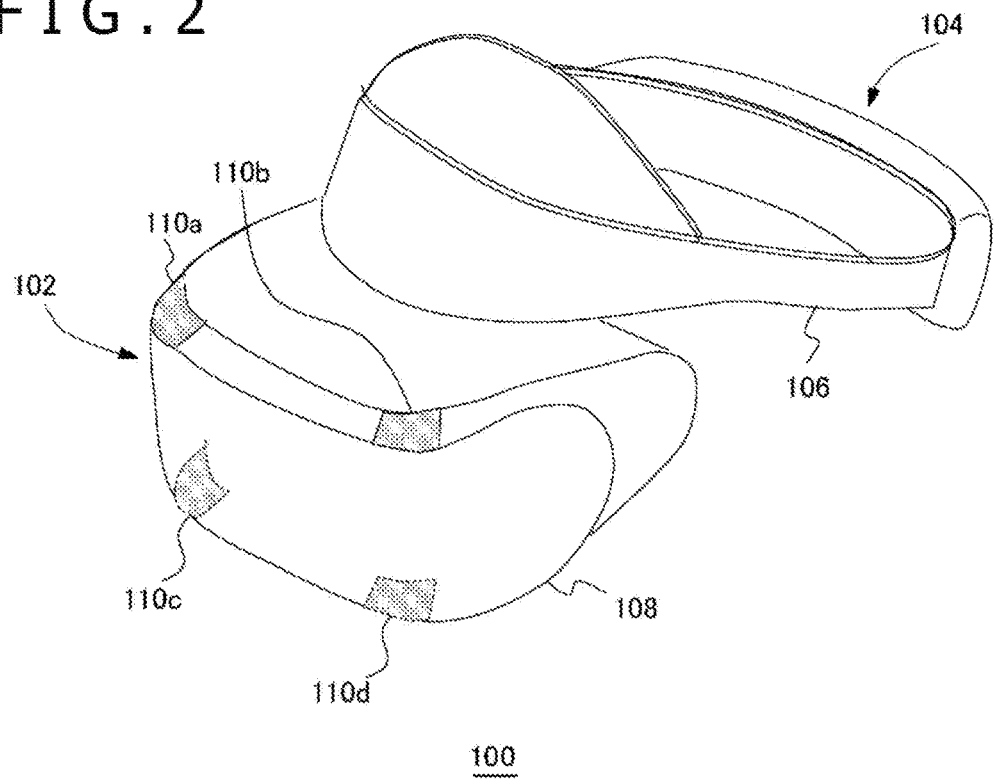
FIG. 2 is a diagram illustrating an example of an appearance shape of an HMD.

FIG. 2 illustrates an example of an appearance shape of the HMD 100. The HMD 100 includes an output mechanism unit 102 and a wearing mechanism unit 104. The wearing mechanism unit 104 includes a wearing band 106 that is worn by the user so as to surround the head part and so as to fix the HMD 100 to the head part. The wearing band 106 has a material or a structure that is adjustable for length in accordance with a head circumference of the user.

The output mechanism unit 102 includes a housing 108 with a shape that covers the left and right eyes in a state in which the user wears the HMD 100 and inside includes the display panels that face the eyes when being worn. The display panels may be liquid crystal panels, organic electroluminescence (EL) panels, or the like. Inside the housing 108, furthermore, the pair of left and right optical lenses that is positioned between the display panels and the eyes of the user and that magnifies a view angle of the user is provided. The HMD 100 may further include speakers, earphones, or the like at positions corresponding to ears of the user and may be configured so that external headphones may be connected to the HMD 100.

Light-emitting markers 110a, 110b, 110c, and 110d are provided on outer surfaces of the housing 108. Though the LEDs for tracking configure the light-emitting markers 110 in the example, other types of markers may be used and it is sufficient anyway if image analysis of positions of the markers may be carried out by the information processing device 10 through imaging by the imaging device 14. A number, an arrangement, and the like of the light-emitting markers 110 are not particularly limited but are required to enable detection of the posture, the position, and the like of the HMD 100 and the light-emitting markers 110 are provided at four corners on a front face of the housing 108 in the illustrated example. Additionally, the light-emitting markers 110 may be provided on side parts, a rear part, or the like of the wearing band 106 such that the imaging may be carried out when the user turns her/his back toward the imaging device 14.

The HMD 100 may be connected to the information processing device 10 with use of a cable or with use of a known wireless communication protocol. The HMD 100 transmits the sensor data detected by the posture sensors to the information processing device 10, meanwhile receives the image data outputted from the information processing device 10, and displays the image data on the display panel for the left eye and the display panel for the right eye.

Figure 3:
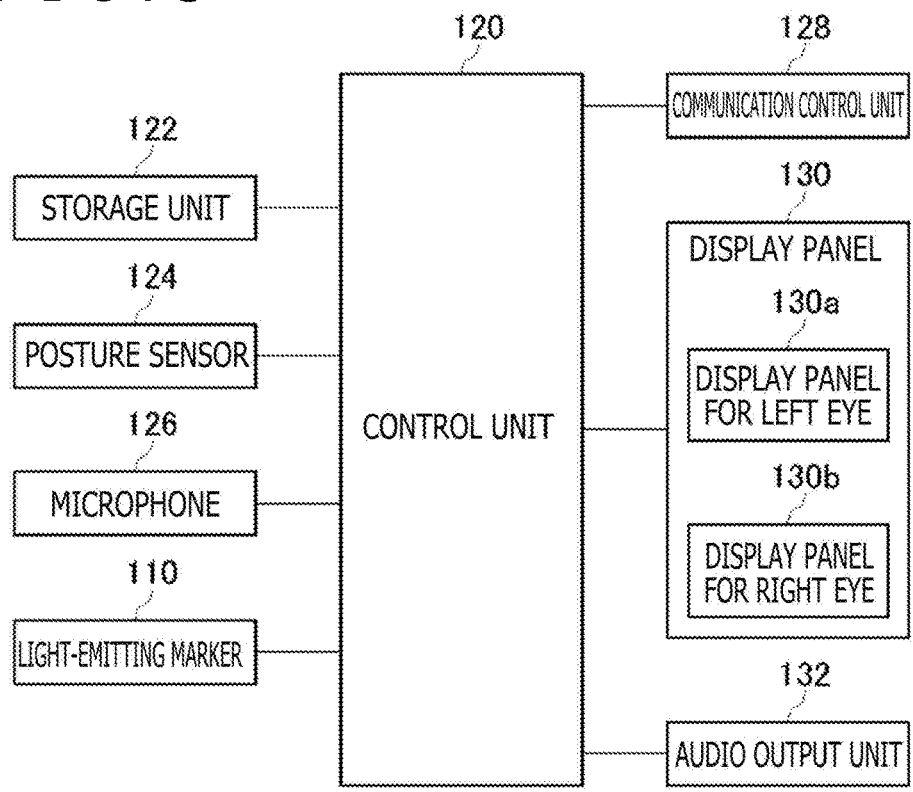
FIG. 3 is a diagram illustrating functional blocks for the HMD.

FIG. 3 illustrates functional blocks for the HMD 100. A control unit 120 is a main processor that processes and outputs various types of data such as image data, audio data, and sensor data, instructions, and the like. A storage unit 122 temporarily stores the data, the instructions, and the like that the control unit 120 processes. Posture sensors 124 detect the posture information regarding the HMD 100. The posture sensors 124 include at least a triaxial acceleration sensor and a triaxial gyro sensor.

A communication control unit 128 transmits the data, outputted from the control unit 120, to the external information processing device 10 by wired or wireless communication through a network adapter or an antenna. In addition, the communication control unit 128 receives data from the information processing device 10 by wired or wireless communication through a network adapter or an antenna and outputs the data to the control unit 120.

Upon reception of the image data, the audio data, or the like from the information processing device 10, the control unit 120 supplies the data to display panels 130 so as to make display on the display panels 130 or supplies the data to an audio output unit 132 so as to cause audio output from the audio output unit 132. The display panels 130 include the display panel 130a for the left eye and the display panel 130b for the right eye and a pair of parallax images is displayed on each display panel. The control unit 120 causes the sensor data from the posture sensors 124, the audio data from a microphone 126, or the like to be transmitted from the communication control unit 128 to the information processing device 10.

Figure 4:
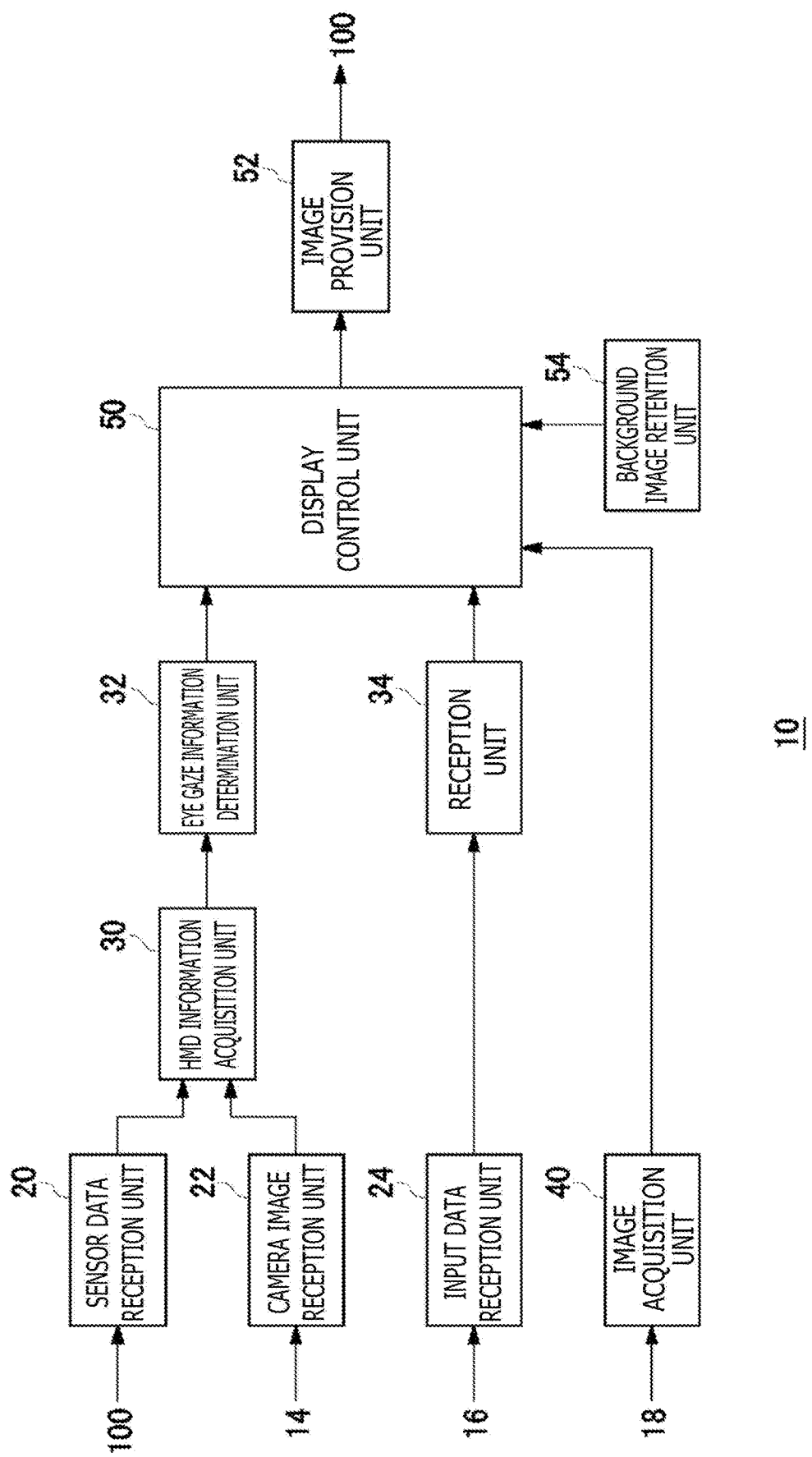
FIG. 4 is a diagram illustrating functional blocks for an information processing device in embodiment 1.

FIG. 4 illustrates functional blocks for the information processing device 10 in embodiment 1. The information processing device 10 includes a sensor data reception unit 20, a camera image reception unit 22, an input data reception unit 24, an image acquisition unit 40, and an image provision unit 52, as input-output interfaces with outside. The information processing device 10 further includes an HMD information acquisition unit 30, an eye gaze information determination unit 32, a reception unit 34, a display control unit 50, and a background image retention unit 54.

Each of elements illustrated as the functional blocks that carry out various processes in FIG. 4 may be configured by a circuit block, a memory, or another large scale integration (LSI) as hardware or is implemented by a program loaded in a memory or the like as software. Therefore, it is to be understood by those skilled in the art the functional blocks may be implemented in various forms by only hardware, only software, or a combination thereof and there is no limitation to any of the forms.

The sensor data reception unit 20 receives the sensor data at specified intervals from the posture sensors 124 in the HMD 100 worn by the user and supplies the sensor data to the HMD information acquisition unit 30. The camera image reception unit 22 receives the images in which the HMD 100 is imaged from the imaging device 14 at specified intervals and supplies the images to the HMD information acquisition unit 30. For instance, the imaging device 14 images a space in front at intervals of (1/60) seconds and the camera image reception unit 22 receives the camera images at intervals of (1/60) seconds. In embodiment 1, the HMD information acquisition unit 30 derives the posture information indicating the posture of the HMD 100 worn on the head part of the user and the positional information indicating the position of the HMD 100 from the sensor data and the shot images. The HMD information acquisition unit 30 supplies the posture information and the positional information that have been derived, to the eye gaze information determination unit 32.

The HMD information acquisition unit 30 detects changes of the posture and the position of the HMD 100 from the sensor data from the posture sensors 124. Then the HMD information acquisition unit 30 may identify the change of the posture of the HMD 100 from the sensor data from the triaxial gyro sensor and may identify the change of the position from the sensor data from the triaxial acceleration sensor. In the HMD information acquisition unit 30, it is desirable to improve detection accuracy for the change of the posture and the change of the position with further utilization of a result of the imaging of the light-emitting markers 110 for the tracking. The eye gaze information determination unit 32 determines the eye direction and the viewpoint position of the user in accordance with the posture information and the positional information regarding the HMD 100. The eye gaze information determination unit 32 provides the eye direction and the viewpoint position that have been determined, for the display control unit 50.

The input data reception unit 24 receives key data, inputted by the user, from the input device 16 and supplies the key data to the reception unit 34. The reception unit 34 receives a user manipulation inputted into the input device 16.

The information processing device 10 of embodiment 1 has functions of acquiring an image in which the subject is positioned in front of a background with a single color, from the distribution server 18, performing the chroma-key composition such that the subject included in the subject image may become a foreground image with respect to the background image, and providing a resultant image for the HMD 100. The image composition function is implemented by a chroma-key composition application installed in the information processing device 10. The user is enabled to utilize the chroma-key composition application, by downloading the chroma-key composition application from a content server into the information processing device 10 in advance.

When the user activates the chroma-key composition application, the image acquisition unit 40 transmits a distribution request for the subject image, to the distribution server 18. The distribution server 18 receives the distribution request from the information processing device 10 and performs streaming distribution to the information processing device 10 of the shot images from the imaging device 19, herein, the shot images of the subject (reporter) who is standing in front of the color screen 5 and who is facing the imaging device 19. The image acquisition unit 40 acquires the subject images through the streaming distribution and provides the subject images for the display control unit 50. The display control unit 50 performs the chroma-key composition such that the subject included in the subject image may become the foreground image with respect to the background image and thereby generates a display image according to the viewpoint position of the user.

Figure 5:
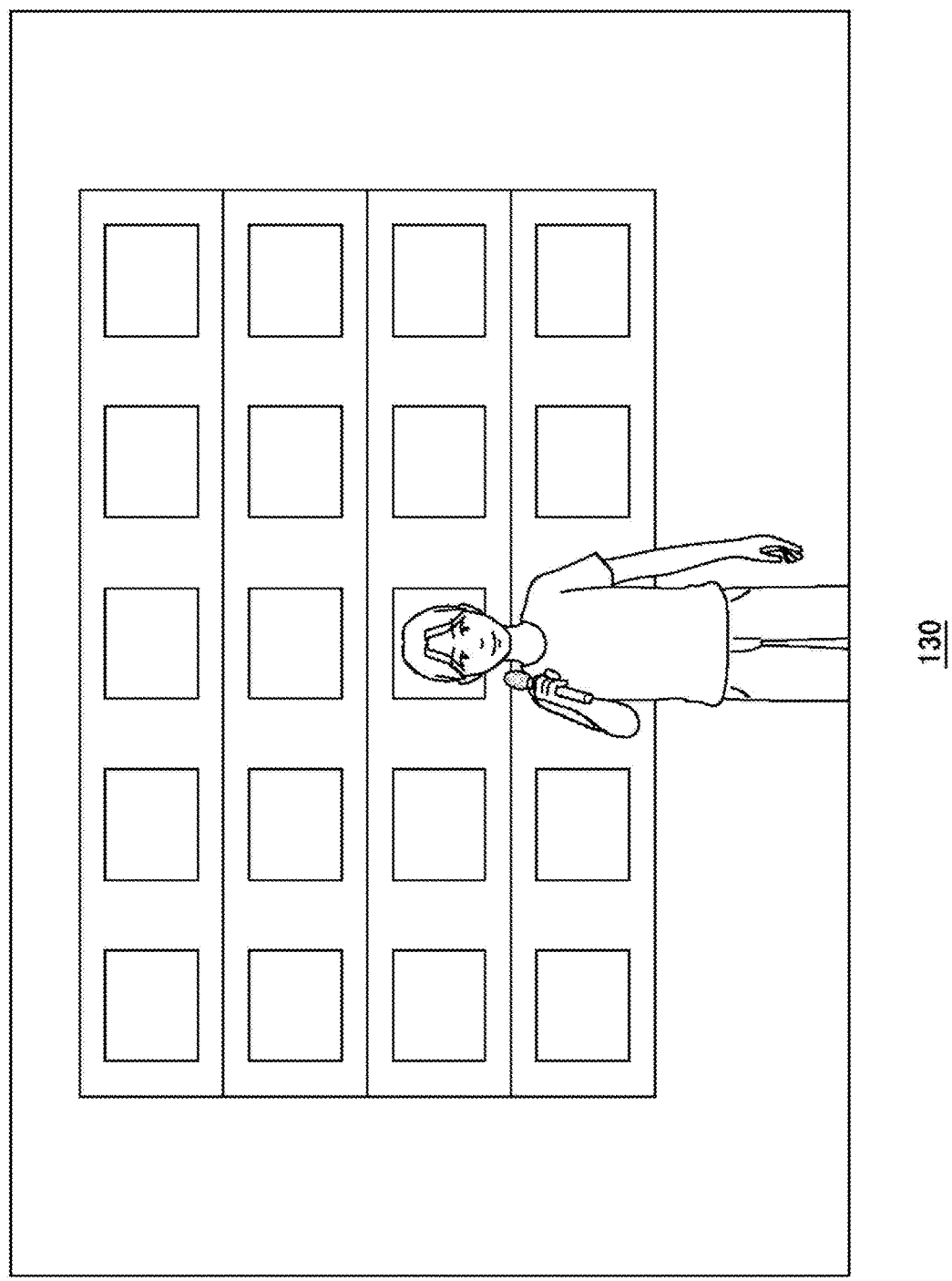
FIG. 5 is a diagram illustrating an example of a chroma-key composite image displayed in the HMD.

FIG. 5 illustrates an example of the chroma-key composite image displayed in the HMD 100. The background image retention unit 54 retains an image that is to be a background in the chroma-key composition process. The background image retention unit 54 may retain various background images. The display control unit 50 reads out the background image from the background image retention unit 54, performs the chroma-key composition such that the subject included in the subject image may become the foreground image with respect to the background image that has been read out, and thereby generates the display image according to the viewpoint position of the user.

In the example illustrated in FIG. 5, the display control unit 50 reads out the background image of a four-story building from the background image retention unit 54 and generates a chroma-key composite image in which the subject being the reporter reports news in front of the building. Note that the background image retention unit 54 retains the background images that are two-dimensional images, whereas the background image retention unit 54 may retain the background images that are three-dimensional images. The user of the information processing device 10 may be capable of freely selecting the background image to be utilized, from the background image retention unit 54.

Alternatively, the background image may be provided from the distribution server 18. In a case where the distribution server 18 distributes the image of the reporter who is reporting news as in embodiment 1, particularly, the distribution server 18 may transmit an appropriate background image to the information processing device 10 in accordance with contents of the news. Then the image acquisition unit 40 may acquire the subject image and the background image and the display control unit 50 may perform the chroma-key composition such that the subject included in the subject image may become the foreground image with respect to the background image.

Though the distribution server 18 provides a news program in the example described above, a technique of embodiment 1 may be utilized for conversation among friends. According to the technique of embodiment 1, the background image may be freely set up in the information processing device 10 and utilization of the HMD 100 may make it possible to look at the subject from an extremely short distance. Thus, the user is enabled to select a place full of memories of the user and a friend of hers/his as the background image and to enjoy a conversation with the friend. Furthermore, the background image retention unit 54 may retain shot images imaged actually by a camera and may retain images produced by computer graphics, as the background images.

As described above, the eye gaze information determination unit 32 determines the eye direction and the viewpoint position of the user in accordance with the posture information and the positional information regarding the HMD 100 and provides the eye direction and the viewpoint position for the display control unit 50. The display control unit 50 generates the display image in accordance with the eye direction and the viewpoint position of the user.

In embodiment 1, the display control unit 50 controls an orientation of the subject such that the subject may face the viewpoint position of the user.

FIGS. 6(a) and (b) are diagrams for description of positional relation among the viewpoint positions, the subject image, and the background image. In the description diagrams, views of the viewpoint positions, the subject image, and the background image from upward are schematically illustrated. Herein, FIG. 6(a) expresses the positional relation before a movement of the viewpoint position and FIG. 6(b) expresses the positional relation after the movement of the viewpoint position.

The display control unit 50 determines the orientation and the position of the subject image such that a perpendicular drawn from the viewpoint position to the subject image may pass through a center of the subject image with respect to a width direction. FIG. 6(a) illustrates a condition before the movement of the viewpoint position and, when the user moves laterally to move the viewpoint position as illustrated in FIG. 6(b), the display control unit 50 changes the orientation of the subject image and exercises control such that the perpendicular drawn from the viewpoint position to the subject image may pass through the center of the subject image with respect to the width direction. Thus, the subject image is made to face the user. On the other hand, the inventor has perceived that the user may have a feeling of strangeness in a case where the orientation of the subject is made to promptly follow a movement of the viewpoint of the user. Therefore, the display control unit 50 may change the orientation of the subject such that the subject may face, with a slight delay, the viewpoint position of the user that is changed.

Figure 7:
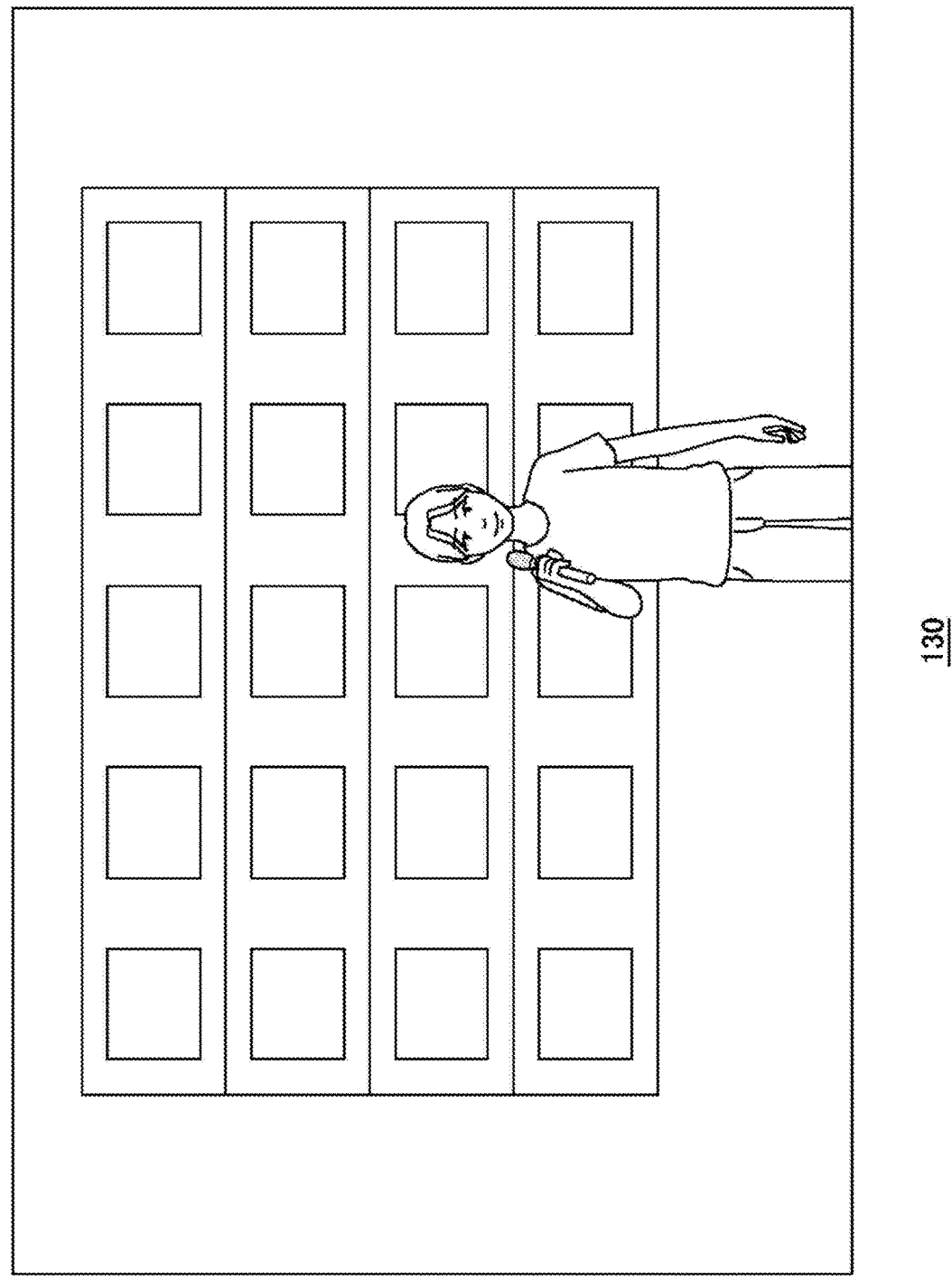
FIG. 7 is a diagram illustrating an example of a chroma-key composite image at time when the viewpoint position is moved.

FIG. 7 illustrates an example of the chroma-key composite image at time when the viewpoint position is moved. In a case where the user looks at the reporter with a shift of the viewpoint position (position of the HMD 100) in a left direction as illustrated in FIG. 6(b), the reporter moves in a right direction relative to the building of the background. Then the reporter is displayed so as to face the user and thus the user may feel as if the reporter were talking to the user. As described above, utilization of this technique for communication between friends may enable keeping a state in which the friends face each other and thereby making a conversation with a feeling of closeness.

Though the distribution of live images of the reporter has been described in relation to embodiment 1, images to be distributed may be recorded images instead of the live images. In this case, the information processing device 10 may be provided with the subject images from the distribution server 18 or from a recording medium such as a digital versatile disc (DVD).

Embodiment 2

In relation to embodiment 2, a case where display images in which a subject moves relative to a background image are generated will be described.

Figure 8:
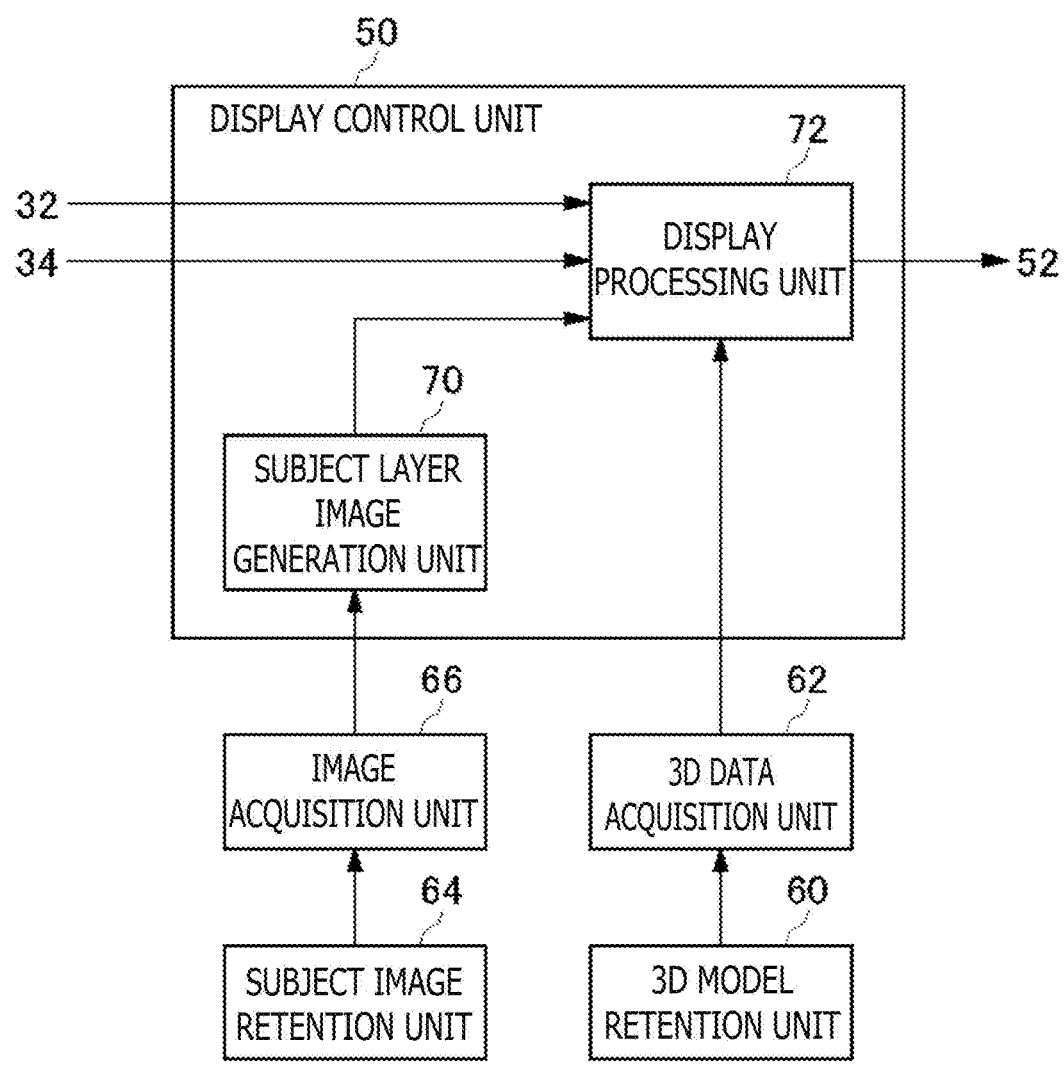
FIG. 8 is a diagram illustrating functional blocks for the information processing device in embodiment 2.

FIG. 8 illustrates functional blocks for the information processing device 10 in embodiment 2. The information processing device 10 includes the display control unit 50, a three-dimensional (3D) model retention unit 60, a 3D data acquisition unit 62, a subject image retention unit 64, and an image acquisition unit 66. In FIG. 8, however, illustration of the sensor data reception unit 20, the camera image reception unit 22, the input data reception unit 24, the HMD information acquisition unit 30, the eye gaze information determination unit 32, the reception unit 34, and the image provision unit 52 that are common configurations illustrated in FIG. 4 is omitted.

Each of elements illustrated as the functional blocks that carry out various processes in FIG. 8 may be configured by a circuit block, a memory, or another LSI as hardware or is implemented by a program loaded in a memory or the like as software. Therefore, it is to be understood by those skilled in the art that the functional blocks may be implemented in various forms by only hardware, only software, or a combination thereof and there is no limitation to any of the forms.

The information processing device 10 of embodiment 2 has functions of generating an image in which a layer image of the subject is placed in a three-dimensional space model and providing the image for the HMD 100. The image composition function is implemented by a chroma-key composition application installed in the information processing device 10. Herein, the three-dimensional space model is produced by analysis of images into which a real space is imaged, definition of a shape model of the space, and pasting of shot images (texture images) on the defined shape.

In embodiment 2, the three-dimensional space model produced from the shot images of the space and the subject images in which a scene with the subject moving in front of a background with a single color is imaged are distributed from the distribution server 18 that is a content providing server to the information processing device 10 and are respectively retained in the 3D model retention unit 60 and the subject image retention unit 64. The information processing device 10 generates display images to be provided for the HMD 100, from the three-dimensional space model retained in the 3D model retention unit 60 and the subject images retained in the subject image retention unit 64. The three-dimensional space images and the subject images, however, may be provided from a recording medium such as a DVD for the information processing device 10.

Figure 9:
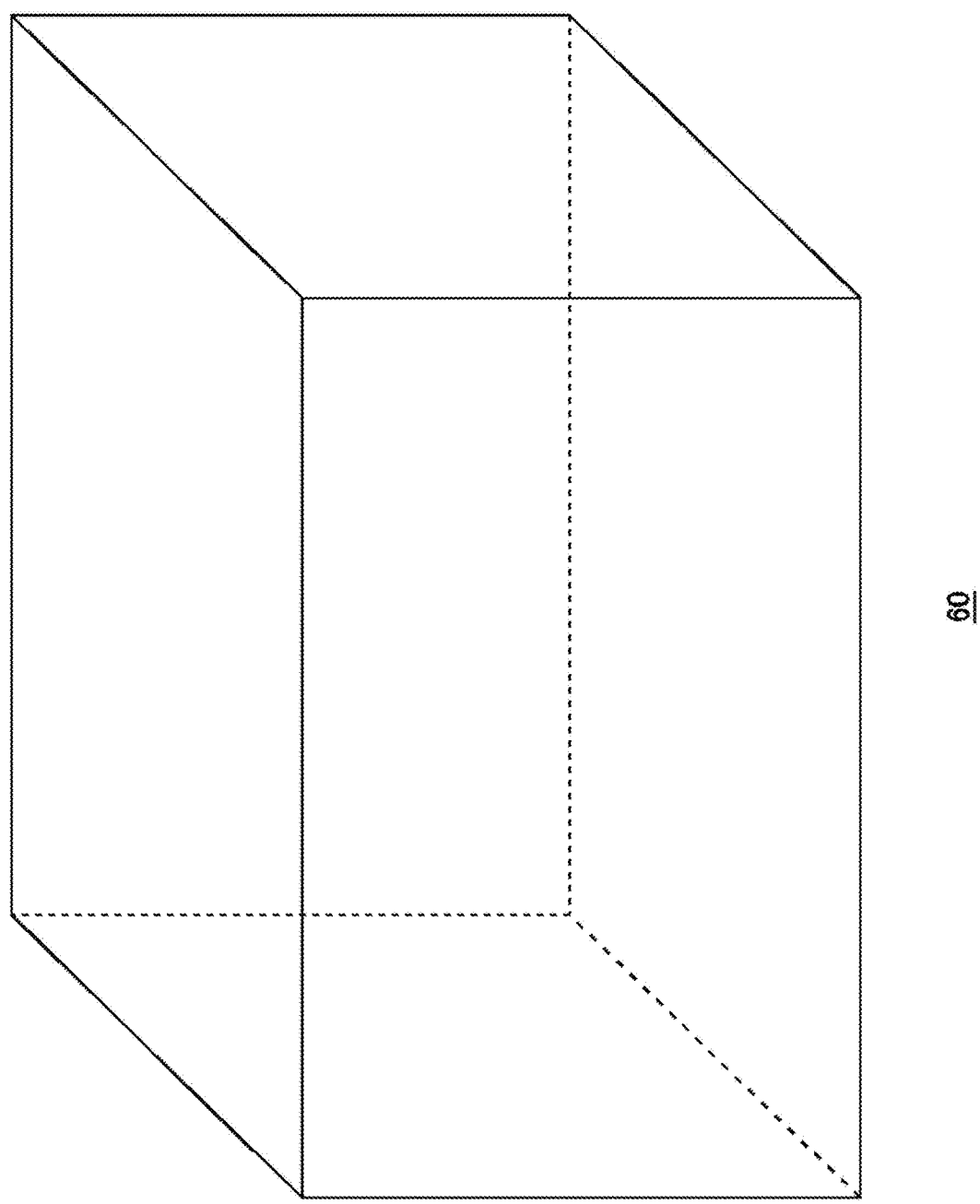
FIG. 9 is a diagram illustrating an example of a three-dimensional space model.

FIG. 9 illustrates an example of the three-dimensional space model. The three-dimensional space model results from modeling of inside of a real room and is configured so that a user wearing the HMD 100 may be capable of observing the inside of the room. As described above, the three-dimensional modeling of the inside of the room is carried out with use of images into which the inside of the room is imaged by a camera. In imaging work, the inside of the room is imaged without omission by the camera placed at a center of the room and borders between walls, a floor, and a ceiling are thereafter identified through accurate joining of shot images, so that modeling of shapes of the walls, the floor, and the ceiling is carried out. The shot images are pasted as the texture images on the modeled shapes and the three-dimensional space model that expresses the inside of the room is thereby produced. The three-dimensional space model may be produced on a side of the distribution server 18 and may be distributed to the information processing device 10.

Though the shot images that are sufficient for the modeling may be prepared by the imaging without omission with change of an orientation of the camera placed at the center of the room on condition that an internal space of the room has such a simple shape as a rectangular parallelepiped, such areas (blind spots) as are not imageable from one camera position may exist depending on the shape of the room, for instance. In such a case, it is desirable to image the blind spots with shift of the camera position and to accurately carry out the shape modeling for the space through joining of shot images.

Figure 10:
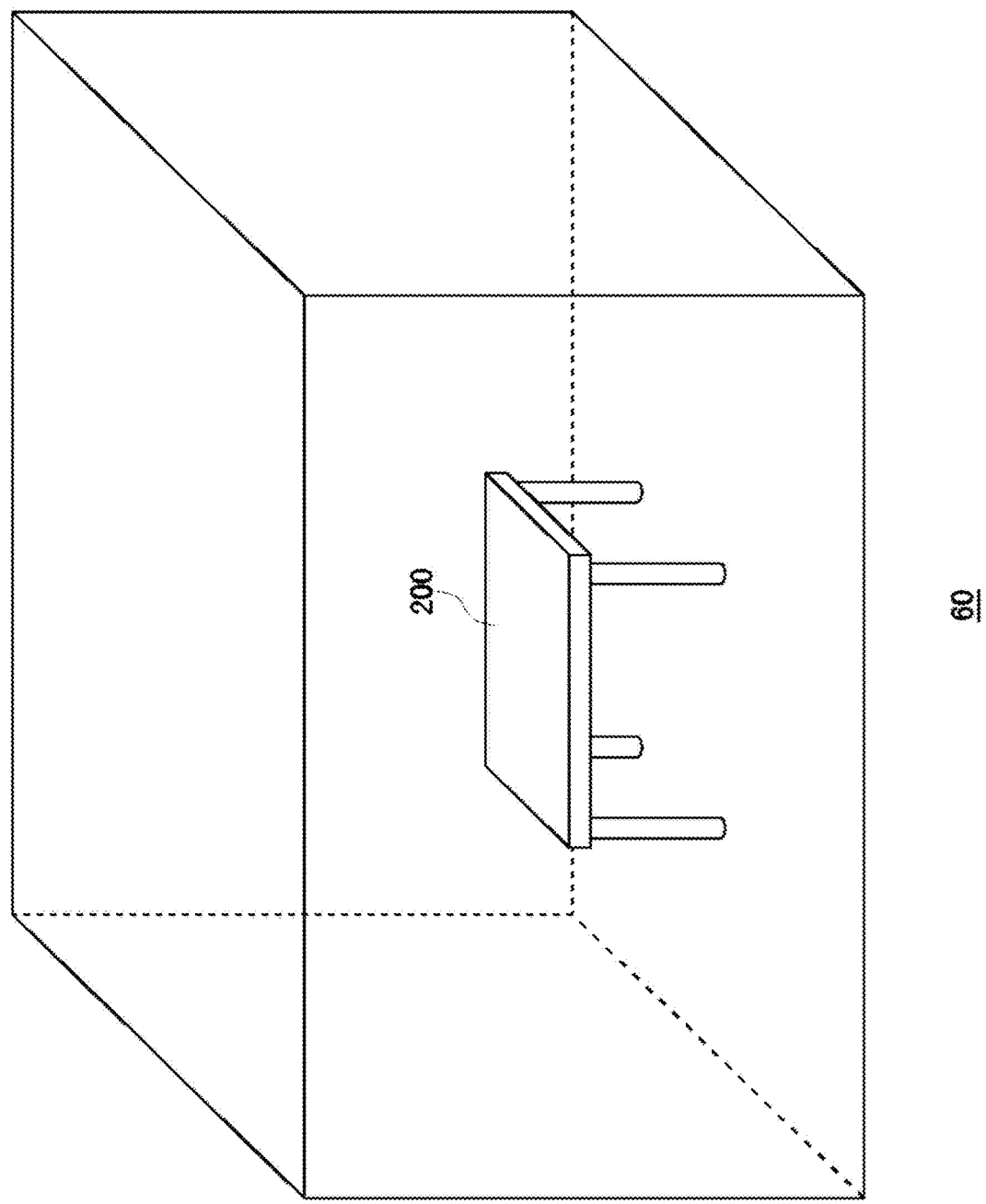
FIG. 10 is a diagram illustrating an example of an object that is placed in the three-dimensional space model.

FIG. 10 illustrates an example of an object 200 that is placed in the three-dimensional space model. The object 200 is a four-legged desk, which is produced as a layer image in which positional information in the three-dimensional space model is defined. In embodiment 2, an image of the desk is extracted from a difference between the room inside images imaged in a state without the desk and the room inside images imaged in a state with placement of the desk, so that the layer image including the positional information in the room as attribute information is produced. In embodiment 2, the 3D model retention unit 60 is supposed to retain the layer image of the object 200 as well, in addition to the three-dimensional space model.

Figure 11:
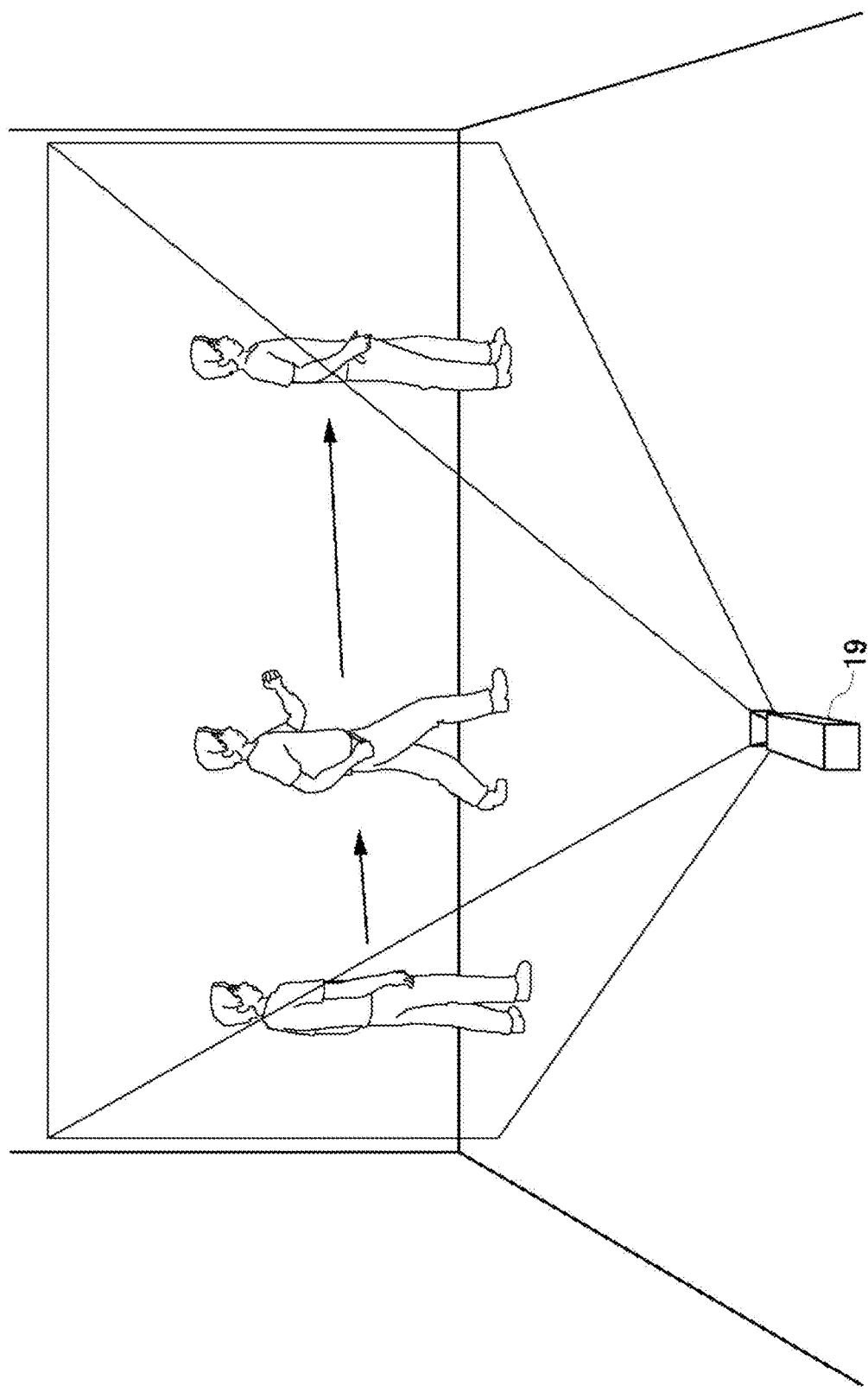
FIG. 11 is a diagram for description of subject images.

FIG. 11 is a diagram for description of the subject images. The subject images are moving images in which the subject actually moving in the same room as imaged for production of the three-dimensional space model is imaged. In FIG. 11, the imaging device 19 is imaging a scene in which the subject that is one person is moving from left to right along a wall on a back side. Though setting of the positional information regarding the subject in the three-dimensional space model is facilitated by placement of the imaging device 19 in the same position where the room inside images for the production of the three-dimensional space model have been produced, the subject may be imaged from another position and the positional information regarding the subject in the three-dimensional space model may be separately defined.

When the subject is imaged, the desk that is a real object is removed from the room and the subject moves through between a place where the desk is to be placed and the wall on the back side so as not to walk through the place where the desk was placed. Then the wall on the back side that configures the background of the subject image is covered with a sheet with a single color such as blue or green for performance of the chroma-key composition, so that the subject images are made as images from which the subject may be extracted by the chroma-key process. The subject image retention unit 64 retains the subject images.

When the user activates the chroma-key composition application, the 3D data acquisition unit 62 acquires the three-dimensional space model from the 3D model retention unit 60 and provides the three-dimensional space model for a display processing unit 72. Additionally, the image acquisition unit 66 acquires the subject images that are the moving images from the subject image retention unit 64 and provides the subject images for a subject layer image generation unit 70. The display processing unit 72 generates display images resulting from composition of the scene of the moving subject on the image of the room configured from the three-dimensional space model.

Initially, the subject layer image generation unit 70 sets up a virtual screen that moves in conformity with a movement of the subject included in the subject images. The virtual screen has such a size as to at least include the subject in the subject images. The subject layer image generation unit 70 carries out processes including projecting the subject image onto the virtual screen, extracting a subject portion through the application of the chroma-key process, and generating a subject layer image. The subject layer image generation unit 70 determines an orientation of the virtual screen on which the subject image is projected, in accordance with the position of the subject included in the subject image.

Figure 12:
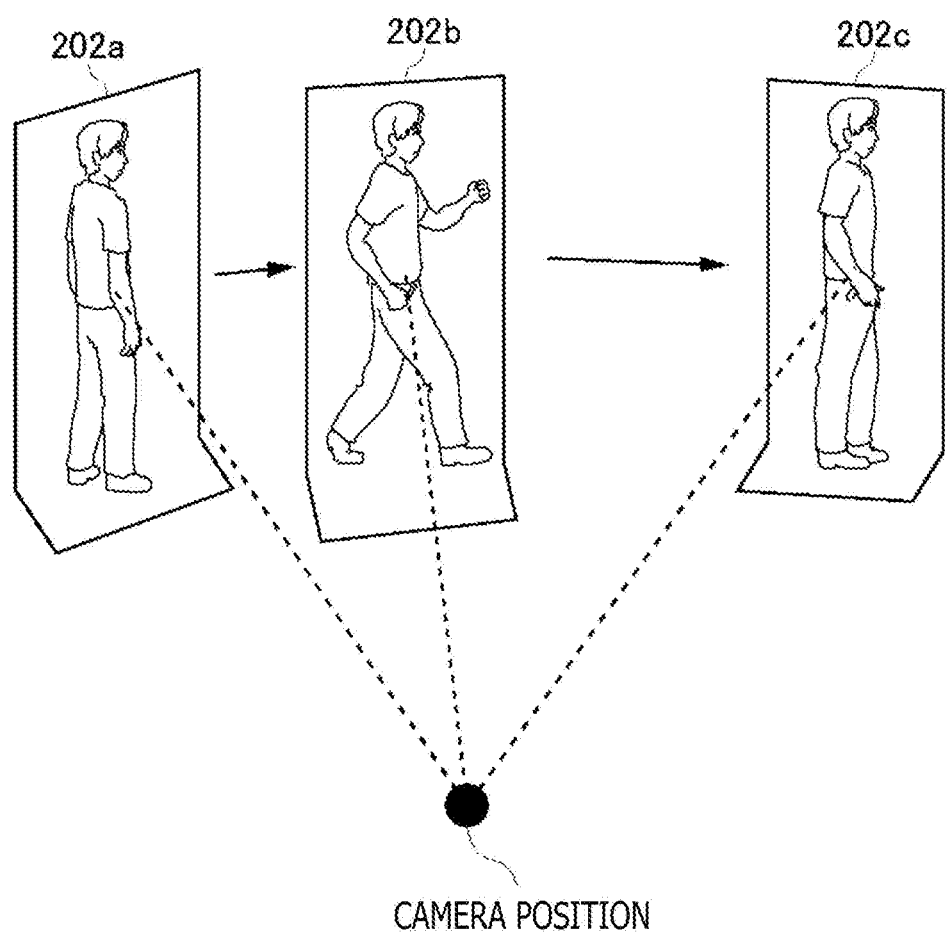
FIG. 12 is a diagram for description of a process of generating subject layer images.

FIG. 12 is a diagram for description of a process of generating the subject layer images. FIG. 12 illustrates setting by the subject layer image generation unit 70 of virtual screens 202a, 202b, and 202c (which may be representatively referred to as "virtual screen 202" below) on which the subject images are projected, in accordance with the position of the subject. Though a plane (standing surface) extending in a vertical direction and a plane extending horizontally under feet are combined in the virtual screen 202 illustrated in FIG. 12, unevenness may be provided for the standing surface in order that a three-dimensional appearance of the person may be brought about.

The subject layer image generation unit 70 determines the orientation of the virtual screen 202 in accordance with relation between a position (camera position) of the imaging device 19 and the position of the subject. Herein, the orientation of the virtual screen 202 is determined so that a line connecting the camera position and the subject may be a perpendicular to the standing surface of the virtual screen 202a. In embodiment 2, images in which the inside of the room is overlooked from a vicinity of the camera position in the three-dimensional space model are provided for the user, whereas the user is capable of moving from the camera position and looking at the subject from a different viewpoint position. The virtual screen 202 on which the subject is projected may be made to face the camera position so that the information processing device 10 may be capable of providing the display images causing no feeling of strangeness for the HMD 100 even if the user has moved somewhat from the camera position.

The display processing unit 72 is provided with the three-dimensional space model from the 3D data acquisition unit 62 and produces the background image with respect to the subject.

Figure 13:
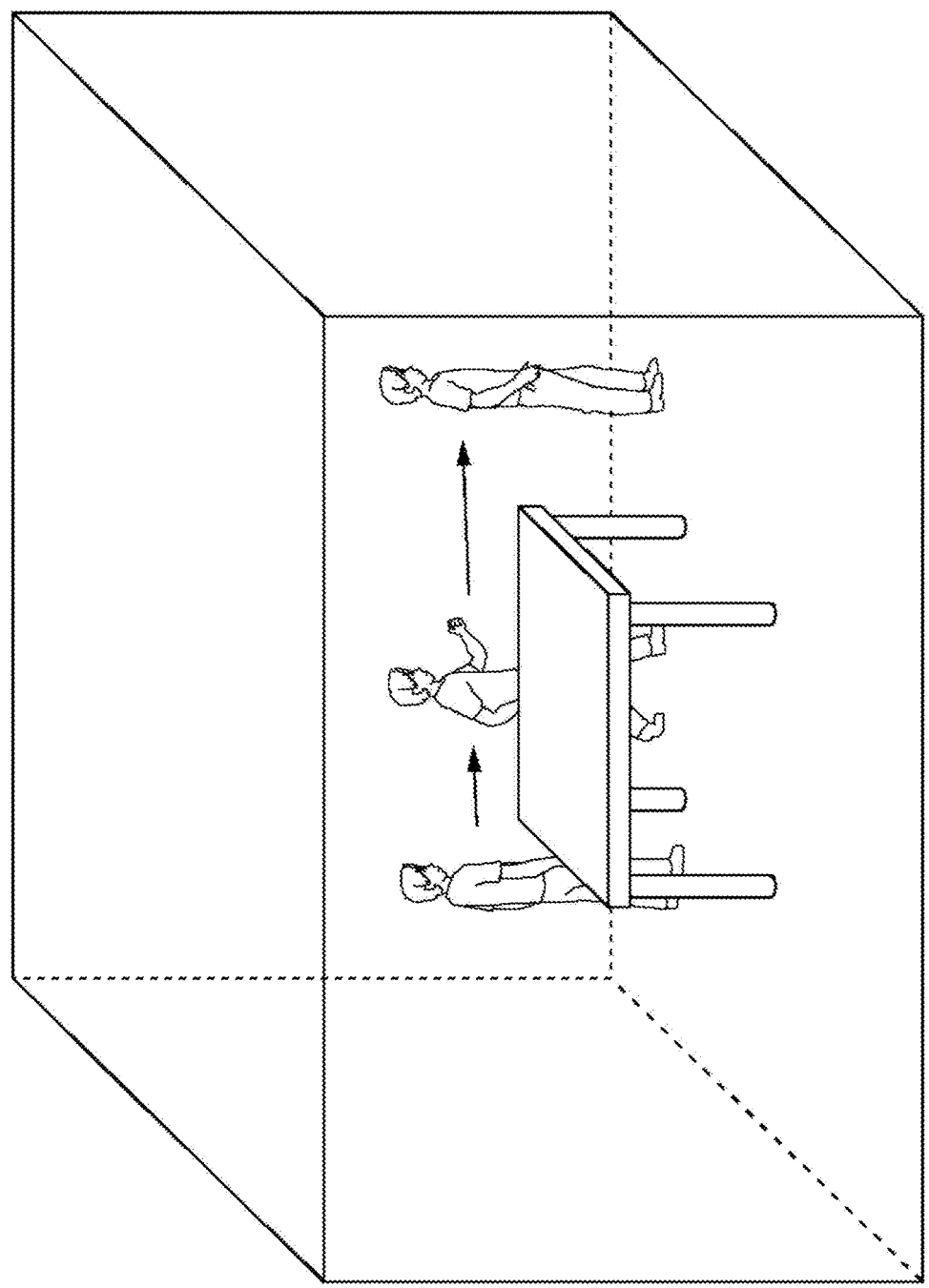
FIG. 13 is a diagram illustrating a movement of the subject in a space between a wall and a desk in a room.

FIG. 13 illustrates a movement of the subject in a space between the wall on the back side and the desk. The display processing unit 72 generates the room inside image with use of the three-dimensional space model and the layer image of the object 200 and generates moving images in which the subject is moving through between the desk and the wall on the back side, by projecting the subject on the virtual screen 202 and by moving the virtual screen 202 in the three-dimensional space. Then the display processing unit 72 generates the display images according to the viewpoint position of the user with the subject layer image and the object layer image placed in the three-dimensional space model and a scene in which a portion of the subject is shielded by the desk may be expressed by placement of the layer image of the object 200 in front of the subject layer image.

The eye gaze information determination unit 32 determines the eye direction and the viewpoint position of the user in accordance with the posture information and the positional information regarding the HMD 100 and provides the eye direction and the viewpoint position for the display processing unit 72. The display processing unit 72 generates the display images in accordance with the eye direction and the viewpoint position of the user. Though the display processing unit 72 may set an initial position of the user in the three-dimensional space on a position where the imaging device 19 is placed, relative positional relation among the object 200, the subject, and the three-dimensional space model changes with the movement of the viewpoint position. Then the virtual screen 202 for the subject basically faces an initial viewpoint position of the user, so that the display processing unit 72 is capable of generating the display images causing no feeling of strangeness even if the viewpoint position has moved somewhat from the initial position.

The present invention has been described above based on the plurality of embodiments. The embodiments are exemplifications and it is to be understood by those skilled in the art that various modifications may be made to combinations of individual components or individual processes of the embodiments and that such modifications are still within the scope of the invention.

Though the composition of the subject image of one person with the background image is performed in embodiments 1 and 2, composition of a plurality of subject images with the background image may be performed.

REFERENCE SIGNS LIST

1 . . . Information processing system, 20 . . . Sensor data reception unit, 22 . . . Camera image reception unit, 24 . . . Input data reception unit, 30 . . . HMD information acquisition unit, 32 . . . Eye gaze information determination unit, 34 . . . Reception unit, 40 . . . Image acquisition unit, 50 . . . Display control unit, 52 . . . Image provision unit, 54 . . . Background image retention unit, 60 . . . 3D model retention unit, 62 . . . 3D data acquisition unit, 64 . . . Subject image retention unit, 66 . . . Image acquisition unit, 70 . . . Subject layer image generation unit, 72 . . . Display processing unit, 100 . . . HMD.

INDUSTRIAL APPLICABILITY

The present invention can be utilized for techniques for generating chroma-key composite images.

The invention claimed is:

1. An information processing device comprising:
a three-dimensional data acquisition unit that acquires a three-dimensional space model produced from shot images of a space;
an image acquisition unit that acquires a subject image in which a subject moves in front of a background with a single color;
a subject layer image generation unit that projects the subject image onto a virtual screen moving in conformity with a movement of the subject included in the subject image and that extracts a subject portion through application of a chroma-key process; and
a display processing unit that generates a display image according to a viewpoint position of a user with a subject layer image placed in the three-dimensional space model, wherein if it is determined in real-time by the information processing device that the subject is shielded by an object in the space, a portion of the subject portion is shielded in the display image generated by the display processing unit.

2. The information processing device according to claim 1,
wherein the subject layer image generation unit determines an orientation of the virtual screen on which the subject image is projected, in accordance with a position of the subject included in the subject image.

3. The information processing device according to claim 1,
wherein the subject image is an image in which the subject moving in the space imaged for production of the three-dimensional space model is imaged.

4. The information processing device according to claim 1, further comprising:
a head-mounted display information acquisition unit that acquires posture information and positional information regarding a head-mounted display worn on a head part of the user; and
an eye gaze information determination unit that determines an eye direction and the viewpoint position of the user in accordance with the posture information and the positional information regarding the head-mounted display,
wherein the display control unit generates the display image in accordance with the eye direction and the viewpoint position.

5. An image generation method comprising:
acquiring a three-dimensional space model produced from shot images of a space;
acquiring a subject image in which a subject moves in front of a background with a single color;
projecting the subject image onto a virtual screen moving in conformity with a movement of the subject included in the subject image;
extracting a subject portion through application of a chroma-key process to the virtual screen on which the subject image is projected;
generating a display image according to a viewpoint position of a user with the subject placed in the three-dimensional space model; and
determining in real-time if the subject is shielded by an object in the space,
wherein if it is determined that the subject is shielded by the object in the space, a portion of the subject portion is shielded in the display image.

6. A non-transitory computer readable medium having stored thereon a program for a computer, the program comprising:
by a three-dimensional data acquisition unit, acquiring a three-dimensional space model produced from shot images of a space;
by an image acquisition unit, acquiring a subject image in which a subject moves in front of a background with a single color;
by a subject layer image generation unit, projecting the subject image onto a virtual screen moving in conformity with a movement of the subject included in the subject image;
by the subject layer image generation unit, extracting a subject portion through application of a chroma-key process to the virtual screen on which the subject image is projected; and
by a display processing unit, generating a display image according to a viewpoint position of a user with the subject placed in the three-dimensional space model,
wherein a perpendicular drawn from the viewpoint position to the subject image passes through the center of the subject image during change in orientation of the subject image.

* * * * *